United States Patent
Liu

(10) Patent No.: US 12,439,342 B2
(45) Date of Patent: Oct. 7, 2025

(54) OPEN-LOOP POWER CONTROL METHODS AND APPARATUSES AND COMPUTER READABLE STORAGE MEDIA

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 539 days.

(21) Appl. No.: 17/905,533

(22) PCT Filed: Mar. 4, 2020

(86) PCT No.: PCT/CN2020/077843
§ 371 (c)(1),
(2) Date: Sep. 2, 2022

(87) PCT Pub. No.: WO2021/174465
PCT Pub. Date: Sep. 10, 2021

(65) Prior Publication Data
US 2023/0121034 A1    Apr. 20, 2023

(51) Int. Cl.
*H04B 7/185* (2006.01)
*H04L 5/00* (2006.01)
(Continued)

(52) U.S. Cl.
CPC ........... *H04W 52/10* (2013.01); *H04L 5/0051* (2013.01); *H04W 52/242* (2013.01)

(58) Field of Classification Search
CPC .... H04W 52/10; H04W 52/242; H04L 5/0051
(Continued)

(56) References Cited

U.S. PATENT DOCUMENTS 8,706,152 B2 * 4/2014 Seo ............... H04W 52/242
370/316
9,491,717 B2 * 11/2016 Kim ............... H04W 52/283
(Continued)

FOREIGN PATENT DOCUMENTS

CN    106375930 A    2/2017
CN    107613553 A    1/2018
(Continued)

OTHER PUBLICATIONS

Samsung. "On PHR Requirements and Calculation" *3GPP TSG RAN WG1 NR Ad-Hoc Meeting RI-1710766*, Jun. 26-30, 2017, 4 pages.
(Continued)

*Primary Examiner* — Amancio Gonzalez
(74) *Attorney, Agent, or Firm* — Oblon, McClelland, Maier &Neustadt, L.L.P.

(57) ABSTRACT

The present disclosure relates to an open-loop power control method and apparatus and a computer readable storage medium, and belongs to the field of communication technologies. The method includes determining, by an access network device, a first path loss compensation factor of a first terminal and a second path loss compensation factor of a second terminal; transmitting, by the access network device, power configuration information, wherein the power configuration information includes the first path loss compensation factor and the second path loss compensation factor. The transmitted power configuration information from the access network device to a terminal includes the first path loss compensation factor and the second path loss compensation factor. The terminal can select to control a transmitted power of the terminal according to one of the first path loss compensation factor and the second path loss (Continued)

compensation factor as required, which is more flexible in application.

9 Claims, 4 Drawing Sheets

(51) Int. Cl.
*H04W 52/10* (2009.01)
*H04W 52/24* (2009.01)

(58) Field of Classification Search
USPC .......................................................... 370/318
See application file for complete search history.

(56) References Cited

U.S. PATENT DOCUMENTS

| | | | | |
|---|---|---|---|---|
| 9,516,608 | B2* | 12/2016 | Seo | H04W 52/283 |
| 9,793,992 | B2* | 10/2017 | Hino | H04L 5/16 |
| 10,560,902 | B2 | 2/2020 | Gao et al. | |
| 10,660,044 | B2* | 5/2020 | MolavianJazi | H04W 52/10 |
| 11,051,256 | B2* | 6/2021 | Jeon | H04W 52/50 |
| 11,122,517 | B2* | 9/2021 | Lou | H04W 74/006 |
| 11,191,029 | B2* | 11/2021 | Li | H04W 52/146 |
| 11,310,834 | B2* | 4/2022 | Lei | H04W 52/265 |
| 11,496,966 | B2* | 11/2022 | Takeda | H04W 72/30 |
| 11,729,723 | B2* | 8/2023 | Yang | H04W 52/36 |
| | | | | 370/329 |
| 11,750,328 | B2* | 9/2023 | Cirik | H04W 72/232 |
| | | | | 370/329 |
| 11,902,910 | B2* | 2/2024 | Cozzo | H04W 52/346 |
| 12,096,374 | B2* | 9/2024 | Huang | H04W 52/10 |
| 12,238,652 | B2* | 2/2025 | Gong | H04W 52/242 |
| 2010/0113026 | A1* | 5/2010 | Narasimha | H04W 72/02 |
| | | | | 455/67.11 |
| 2017/0064638 | A1* | 3/2017 | Li | H04W 52/10 |
| 2017/0302337 | A1* | 10/2017 | Liu | H04L 5/14 |
| 2019/0230600 | A1 | 7/2019 | Gao et al. | |
| 2020/0068500 | A1 | 2/2020 | Liu et al. | |
| 2020/0068502 | A1 | 2/2020 | Mao et al. | |
| 2020/0154467 | A1* | 5/2020 | Gong | H04L 5/0055 |
| 2021/0410084 | A1* | 12/2021 | Li | H04W 52/265 |
| 2022/0271890 | A1* | 8/2022 | Grossmann | H04B 7/0695 |
| 2022/0303909 | A1* | 9/2022 | Kwon | H04W 16/28 |
| 2023/0113942 | A1* | 4/2023 | Wang | H04W 24/08 |
| | | | | 370/252 |
| 2023/0180142 | A1* | 6/2023 | Nguyen | H04W 52/325 |
| | | | | 455/522 |

FOREIGN PATENT DOCUMENTS

| | | |
|---|---|---|
| CN | 108811060 A | 11/2018 |
| CN | 108811063 A | 11/2018 |

OTHER PUBLICATIONS

International Search Report mailed on Dec. 4, 2020 in PCT/CN2020/077843 filed on Mar. 4, 2020 (2 pages).
Chinese Office Action dated Sep. 28, 2021 in Chinese Application 202080000478.8 (19 page).

* cited by examiner

OPEN-LOOP POWER CONTROL METHODS AND APPARATUSES AND COMPUTER READABLE STORAGE MEDIA

CROSS REFERENCE TO RELATED APPLICATIONS

The present application is a U.S. National Stage of International Application No. PCT/CN2020/077843 filed on Mar. 4, 2020, the contents of which are incorporated herein by reference in its entireties for all purposes.

TECHNICAL FIELD

The present disclosure relates to the field of communication technologies, and in particular, to open-loop power control methods and apparatuses and computer readable storage media.

BACKGROUND OF THE INVENTION

Field of the Invention

Open-loop power control refers to a method in which a receiving end does not need to feed back a receiving situation, and a transmitting end determines a transmitted power by itself. Uplink open-loop power control, also known as reverse link open-loop power control, refers to a method in which a terminal does not need an access network device to feed back a receiving situation, and the terminal determines a transmitted power by itself.

Description of the Related Art

In the related art, the terminal determines the transmitted power based on a path loss compensation factor configured by the access network device, where path loss compensation factors configured by the access network device for different terminals are same, and implementation methods are relatively simple.

SUMMARY OF THE INVENTION

In examples of the present disclosure, there are provided open-loop power control methods and apparatuses and computer readable storage media, so that different path loss compensation factors can be configured for different terminals, and a terminal can select a path loss compensation factor to control a transmitted power as required. Technical solutions are as follows:

According to a first aspect of the examples of the present disclosure, there is provided an open-loop power control method that can include determining, by an access network device, a first path loss compensation factor of a first terminal and a second path loss compensation factor of a second terminal, and transmitting, by the access network device, power configuration information, where the power configuration information includes the first path loss compensation factor and the second path loss compensation factor.

In at least one example of the present disclosure, the first terminal is a non-reduced capability terminal, the second terminal is a reduced capability terminal, and a value of the first path loss compensation factor is smaller than a value of the second path loss compensation factor.

In at least one example of the present disclosure, the method further includes transmitting, by the access network device, a path loss threshold.

According to a second aspect of the examples of the present disclosure, there is provided an open-loop power control method that can include receiving, by a terminal, transmitted power configuration information, where the transmitted power configuration information includes a first path loss compensation factor and a second path loss compensation factor, determining, by the terminal, a target path loss compensation factor based on the transmitted power configuration information, where the target path loss compensation factor is one of the first path loss compensation factor and the second path loss compensation factor, and controlling, by the terminal, a transmitted power of the terminal based on the target path loss compensation factor.

In at least one example of the present disclosure, determining, by the terminal, the target path loss compensation factor based on the transmitted power configuration information includes, when the terminal is a non-reduced capability terminal, determining the first path loss compensation factor to be the target path loss compensation factor; or, when the terminal is a reduced capability terminal, determining the second path loss compensation factor to be the target path loss compensation factor, where a value of the first path loss compensation factor is smaller than a value of the second path loss compensation factor.

In at least one example of the present disclosure, determining, by the terminal, the target path loss compensation factor based on the transmitted power configuration information includes determining, by the terminal, the target path loss compensation factor based on the transmitted power configuration information and a path loss value measured by the terminal.

In at least one example of the present disclosure, determining, by the terminal, the target path loss compensation factor based on the transmitted power configuration information and the path loss value measured by the terminal includes, if the path loss value is not greater than a path loss threshold, using the first path loss compensation factor as the target path loss compensation factor; or, if the path loss value is greater than a path loss threshold, using the second path loss compensation factor as the target path loss compensation factor, where a value of the first path loss compensation factor is smaller than a value of the second path loss compensation factor.

In at least one example of the present disclosure, the method further includes receiving, by the terminal, the path loss threshold from an access network device.

In at least one example of the present disclosure, determining, by the terminal, the target path loss compensation factor based on the transmitted power configuration information includes determining, by the terminal, the target path loss compensation factor based on the transmitted power configuration information and a type of a reference signal, where the reference signal is used to determine a path loss value between the terminal and an access network device.

In at least one example of the present disclosure, determining, by the terminal, the target path loss compensation factor based on the transmitted power configuration information and the type of the reference signal includes, if the type of the reference signal includes only an SSB, using the first path loss compensation factor as the target path loss compensation factor; or, if the type of the reference signal includes an SSB, and at least one reference signal other than the SSB, using the second path loss compensation factor as the target path loss compensation factor, where a value of the first path loss compensation factor is smaller than a value of the second path loss compensation factor.

In at least one example of the present disclosure, determining, by the terminal, the target path loss compensation factor based on the transmitted power configuration information includes determining, by the terminal, the target path loss compensation factor based on the transmitted power configuration information and a type/types of a channel/signal through which the terminal transmits data.

In at least one example of the present disclosure, determining, by the terminal, the target path loss compensation factor based on the transmitted power configuration information and the type/types of the channel/signal through which the terminal transmits data includes, if the type/types of the channel/signal is/are PUCCHs, using the first path loss compensation factor as the target path loss compensation factor; or, if the type/types of the channel/signal is/are non-PUCCHs, using the second path loss compensation factor as the target path loss compensation factor, where a value of the first path loss compensation factor is smaller than a value of the second path loss compensation factor.

According to a third aspect of the examples of the present disclosure, there is provided an open-loop power control apparatus that can include a processor and a memory for storing processor executable instructions. The processor can be configured to load and execute the executable instructions to implement the open-loop power control method according to the first aspect or the second aspect.

According to a fourth aspect of the examples of the present disclosure, there is provided a non-transitory computer readable storage medium, where instructions in the computer readable storage medium are executed by a processor to implement the open-loop power control method according to the first aspect or the second aspect.

The technical solutions according to the examples of the present disclosure can have the following beneficial effects. For example, the transmitted power configuration information from the access network device to the terminal includes the first path loss compensation factor and the second path loss compensation factor. The terminal can select to control the transmitted power of the terminal according to one of the first path loss compensation factor and the second path loss compensation factor as required, which is more flexible in application.

It should be understood that the above general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate examples consistent with the present disclosure and, together with the description, serve to explain the principles of the disclosure.

DETAILED DESCRIPTION OF THE PREFERRED EMBODIMENTS

Figure 1:
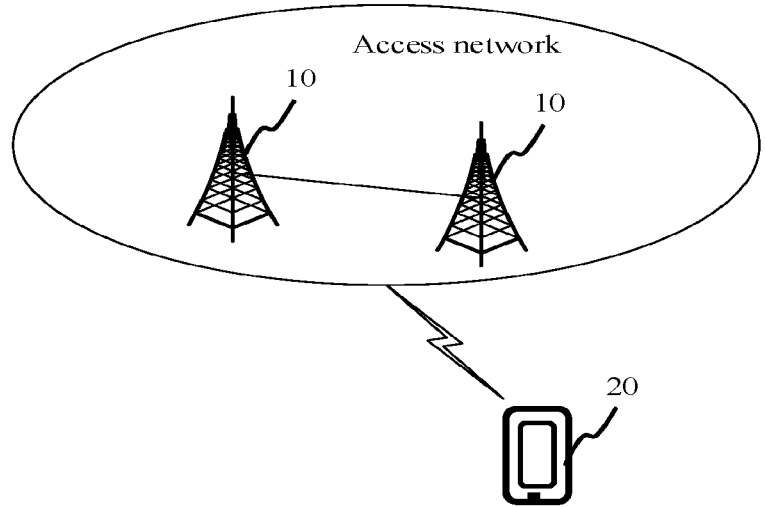
FIG. 1 is a block diagram illustrating a communication system according to an example of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

FIG. 1 is a schematic structural diagram illustrating a mobile communication system according to an example of the present disclosure. The mobile communication system may include: access network devices 10, and terminals 20.

The access network devices 10 are deployed in a wireless access network to provide a wireless access function for the terminals 20. The access network devices can be base stations (BSs). The access network devices 10 can wirelessly communicate with the terminals 20 via one or more antennas. The access network devices 10 can provide communication coverage for geographical areas where the access network devices 10 are located. There may include different types of BSs, such as macro BSs, micro BSs, relay stations, and access points. In some examples, BSs may be referred to by those skilled in the art as BS transceivers, wireless BSs, access points, wireless transceivers, Basic Service Sets (BSSs), Extended Service Sets (ESSs), NodeBs, evolved NodeBs (eNBs or eNodeBs), or some other appropriate terms. In some examples, in a 5G system, BSs are referred to as gNBs. For convenience of description, in the examples of the present disclosure, apparatuses that provide a wireless communication function for the terminals 20 are collectively referred to as access network devices.

The terminals 20 may be dispersed throughout the mobile communication system, and each terminal 20 may be stationary or mobile. The terminals 20 may be referred to by those skilled in the art as mobile stations, subscriber stations, mobile units, subscriber units, wireless units, remote units, mobile devices, user equipment, wireless devices, wireless communication devices, remote devices, mobile subscriber stations, access terminals, mobile terminals, wireless terminals, remote terminals, handheld devices, user agents, mobile clients, clients, or some other appropriate terms. Terminals 20 may be cell phones, Personal Digital Assistants (PDAs), radio modems, wireless communication devices, handheld devices, tablet computers, laptop computers, cordless phones, Wireless Local Loop (WLL) stations, etc. The terminals 20 can communicate with the access network devices 10 in the mobile communication system.

The access network devices 10 and the terminals 20 can communicate with each other through an air interface technology, for example, through a cellular technology. Communication links between the access network devices 10 and the terminals 20 may include: Downlink (DL) transmission from the access network devices 10 to the terminals 20, and/or, Uplink (UL) transmission from the terminals 20 to the access network devices 10. The DL transmission may be referred to as forward link transmission, and the UL transmission may be referred to as reverse link transmission. In some examples, DL transmission may include transmission of discovery signals, which may include reference signals and/or synchronization signals.

The mobile communication system shown in FIG. 1 may be a Long Term Evolution (LTE) system, or a next generation evolution system based on an LTE system, such as an LTE-Advanced (LTE-A) system or a $5^{th}$ Generation (5G) system (also known as an NR system), or a next generation evolution system based on a 5G system, or the like. In the examples of the present disclosure, terms "system" and "network" are often used interchangeably, but those skilled in the art can understand their meanings.

Communication systems and service scenarios described in the examples of the present disclosure are for the purpose of illustrating the technical solutions of the examples of the present disclosure more clearly, and do not constitute a limitation on the technical solutions provided by the examples of the present disclosure. As can be known by those of ordinary skill in the art, with the evolution of communication systems and the emergence of new service scenarios, the technical solutions provided by the examples of the present disclosure are also applicable to similar technical problems.

In the related art, terminals with different capabilities exist in a communication system to adapt to requirements in different service scenarios, such as enhanced Mobile Broadband (eMBB), massive Machine-Type Communications (mMTC), Ultra-Reliable and Low Latency Communication (URLLC), and Time Sensitive Communication (TSC). TSC has lower requirements than eMBB and URLLC but much higher requirements than mMTC on throughput, latency, reliability, etc, and has lower restrictions than mMTC but greatly exceeds eMBB and URLLC on equipment cost, volume and power consumption. That is to say, terminals with different capabilities may exist in a same communication system. Terminals with poor capabilities may be referred to as reduced capability terminals, and terminals with stronger capabilities may be referred to as non-reduced capability terminals, or ordinary terminals. For the terminals with different capabilities, an open-loop power of the terminals can be controlled separately.

In the examples of the present disclosure, UL open-loop power control is directed mainly at Physical Uplink Shared Channels (PUSCHs), Physical Uplink Control Channel (PUCCHs), and Sounding Reference Signals (SRSs). PUSCHs are used by a terminal to transmit UL data information. PUCCHs are used by a terminal to transmit UL control information, such as ACKnowledgement/negative ACKnowledgement (ACK/NACK), and Channel Quality Information (CQI). SRSs are used by an access network device to estimate UL channel quality.

Figure 2:
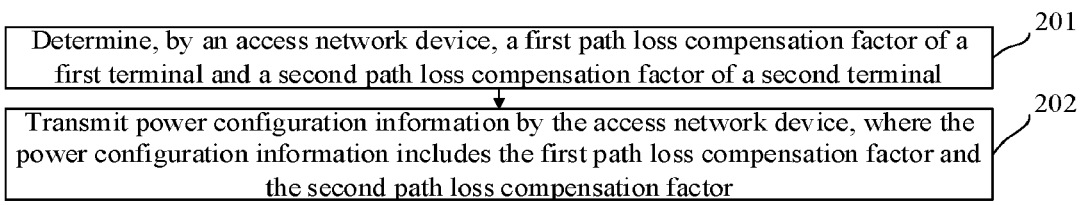
FIG. 2 is a flowchart illustrating an open-loop power control method according to an example.

FIG. 2 is a flowchart illustrating an open-loop power control method according to an example. Referring to FIG. 2, the method includes the following steps:

At step 201, an access network device determines a first path loss compensation factor of a first terminal and a second path loss compensation factor of a second terminal.

At step 202, the access network device transmits power configuration information, where the power configuration information includes the first path loss compensation factor and the second path loss compensation factor.

In some examples, the first terminal is a non-reduced capability terminal, the second terminal is a reduced capability terminal, and a value of the first path loss compensation factor is smaller than a value of the second path loss compensation factor.

In some examples, the method further includes: transmitting, by the access network device, a path loss threshold.

It should be noted that steps 201-202 can be combined arbitrarily with the above optional steps.

Figure 3:
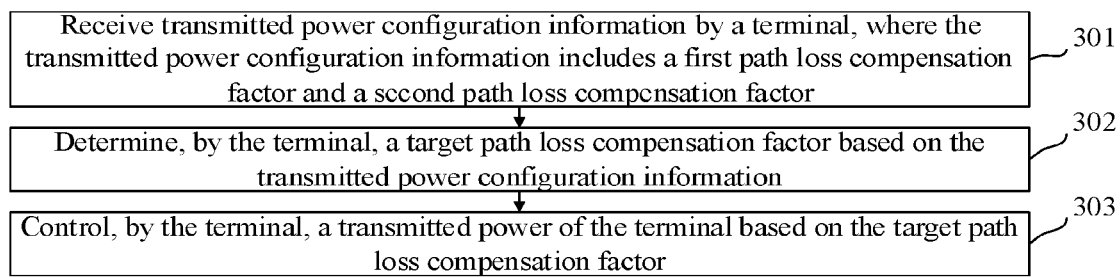
FIG. 3 is a flowchart illustrating an open-loop power control method according to an example.

FIG. 3 is a flowchart illustrating an open-loop power control method according to an example. Referring to FIG. 3, the method includes the following steps:

At step 301, a terminal receives transmitted power configuration information, where the transmitted power configuration information includes a first path loss compensation factor and a second path loss compensation factor.

At step 302, the terminal determines a target path loss compensation factor based on the transmitted power configuration information, where the target path loss compensation factor is one of the first path loss compensation factor and the second path loss compensation factor.

At step 303, the terminal controls a transmitted power of the terminal based on the target path loss compensation factor.

In an example, when the terminal is a non-reduced capability terminal, it is determined that the first path loss compensation factor is the target path loss compensation factor; or, when the terminal is a reduced capability terminal, it is determined that the second path loss compensation factor is the target path loss compensation factor, where a value of the first path loss compensation factor is smaller than a value of the second path loss compensation factor.

In another example, the terminal determines the target path loss compensation factor based on the transmitted power configuration information and a path loss value measured by the terminal.

In some examples, determining, by the terminal, the target path loss compensation factor based on the transmitted power configuration information and the path loss value measured by the terminal includes:
  if the path loss value is not greater than a path loss threshold, using the first path loss compensation factor as the target path loss compensation factor; or,
  if the path loss value is greater than a path loss threshold, using the second path loss compensation factor as the target path loss compensation factor,
  where a value of the first path loss compensation factor is smaller than a value of the second path loss compensation factor.

In some examples, the method further includes: receiving, by the terminal, a path loss threshold from an access network device.

In some examples, determining, by the terminal, the target path loss compensation factor based on the transmitted power configuration information includes determining, by the terminal, the target path loss compensation factor based on the transmitted power configuration information and a type of a reference signal, where the reference signal is used to determine a path loss value between the terminal and the access network device.

In some examples, determining, by the terminal, the target path loss compensation factor based on the transmitted power configuration information and the type of the reference signal includes, if the type of the reference signal includes only a Synchronization Signal and PBCH Block (SSB), using the first path loss compensation factor as the target path loss compensation factor; or, if the type of the reference signal includes an SSB, and at least one reference signal other than the SSB, using the second path loss compensation factor as the target path loss compensation factor.

It should be noted that steps 301-303 can be combined arbitrarily with the above optional steps.

Figure 4:
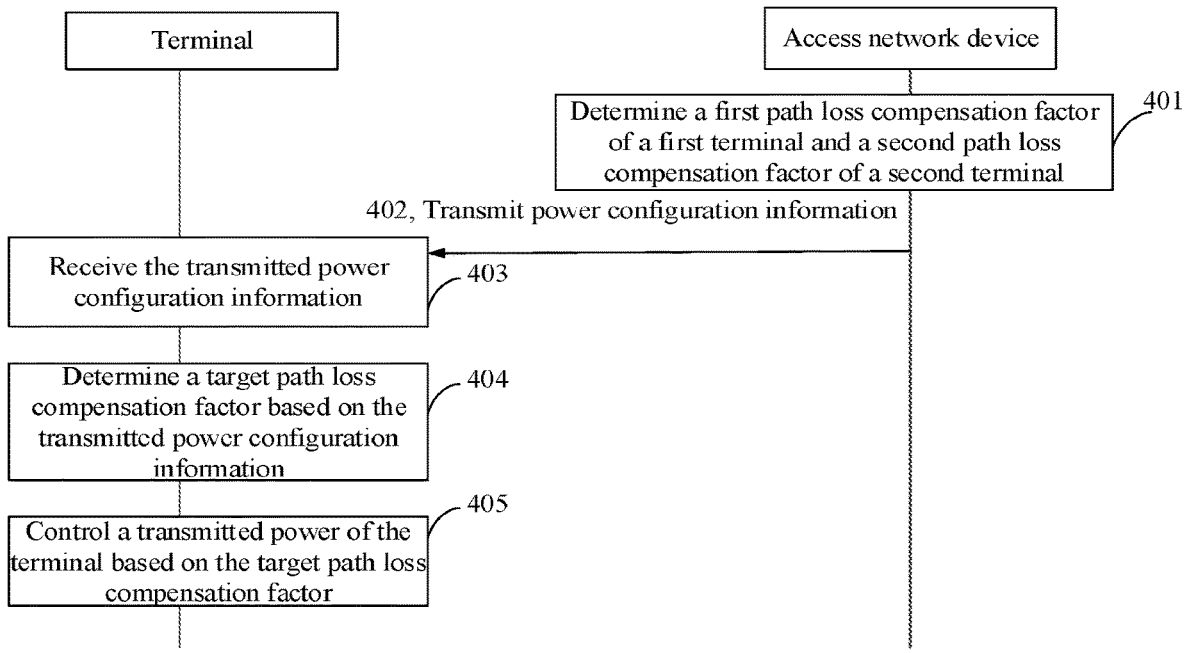
FIG. 4 is a flowchart illustrating an open-loop power control method according to an example.

FIG. 4 is a flowchart illustrating an open-loop power control method according to an example. The method may be executed jointly by an access network device and a terminal. Referring to FIG. 4, the method includes the following steps:

At step 401, an access network device determines a first path loss compensation factor of a first terminal and a second path loss compensation factor of a second terminal.

In some examples, the first terminal is a non-reduced capability terminal, and the second terminal is a reduced capability terminal. A capability of the first terminal is stronger than a capability of the second terminal.

In an example, the access network device determines there may be at least one first path loss compensation factor of the first terminal. For example, different first path loss compensation factors may be determined for different channels/signals. Second path loss compensation factors may be in one-to-one correspondence with first path loss compensation factors.

The channels/signals include, but are not limited to, PUCCHs, PUSCHs and SRSs.

Values of at least a part of first path loss compensation factors are not equal to values of corresponding second path loss compensation factors. That is, values of all first path loss compensation factors may be not equal to values of corresponding second path loss compensation factors. For example, a value of a first path loss compensation factor is smaller than a value of a second path loss compensation factor. Or, values of some first path loss compensation factors are not equal to values of corresponding second path loss compensation factors. For example, values of first path loss compensation factors corresponding to PUCCHs are not equal to values of second path loss compensation factors, and values of first path loss compensation factors corresponding to PUSCHs and SRSs are equal to values of second path loss compensation factors.

In the examples of the present disclosure, path loss compensation factors may be referred to as power control factors or the like. Their value range can be [0, 1].

At step 402, the access network device transmits power configuration information, where the power configuration information includes the first path loss compensation factor and the second path loss compensation factor.

In an example, the first path loss compensation factor and the second path loss compensation factor are carried in a same message.

In some examples, the message may be a measurement control message. The message includes two parallel parameter groups, one of which is used to indicate the first path loss compensation factor, and the other one of which is used to indicate the second path loss compensation factor. In some examples, the message may further include an identifier corresponding to the second path loss compensation factor, so that the second terminal can identify the second path loss compensation factor. A parameter group is added to an existing message to indicate the second path loss compensation factor, which is easy to be implemented.

In another example, the first path loss compensation factor and the second path loss compensation factor may be carried in different messages and transmitted respectively.

At step 403, a terminal receives the transmitted power configuration information.

At step 404, the terminal determines a target path loss compensation factor based on the transmitted power configuration information.

The target path loss compensation factor is one of the first path loss compensation factor and the second path loss compensation factor.

In some examples, step 404 may include, when the terminal is a non-reduced capability terminal, determining the first path loss compensation factor to be the target path loss compensation factor; or, when the terminal is a reduced capability terminal, determining the second path loss compensation factor to be the target path loss compensation factor.

At step 405, the terminal controls a transmitted power of the terminal based on the target path loss compensation factor.

In some examples, for PUSCHs, a transmitted power of a terminal can be determined according to the following formula (1):

$$P_{PUSCH,b,f,c}(i, j, q_d, l) = \min\left\{\begin{array}{l}P_{CMAX,f,c}(i),\\ P_{O\_PUSCH,f,b,c}(j) + 10\log_{10}(2^\mu \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i, l)\end{array}\right\}, \quad (1)$$

where b represents UL BWP (referred to as Bandwidth Part); f represents a carrier; c represents a serving cell; i represents a transmission opportunity; j represents a parameter set configuration index; $q_d$ represents a reference signal resource index (RS resource index); l represents a PUSCH power control adjustment state; $P_{PUSCH,b,f,c}$ (i, j, $q_d$, l) is a PUSCH transmitted power of a terminal; min is a minimum value; $P_{CMAX,f,c}(i)$ is a maximum transmitted power of a terminal, which is a configuration value; $P_{O\_PUSCH,b,f,c}(j)$ is a receiving power expected by an access network device, which can be configured by high-level signaling; μ is a subcarrier interval configuration; $M_{RB,b,f,c}^{PUSCH}(i)$ is a PUSCH transmission bandwidth, which is expressed by a number of RBs; 10 $\log_{10}(2^\mu \cdot M_{RB,b,f,c}^{PUSCH}(i))$ is a closed-loop offset; $\alpha_{b,f,c}(j)$ is a target path loss compensation factor; $PL_{b,f,c}(q_d)$ is a path loss value measured by a terminal; $\Delta_{TF,b,f,c}(i)$ is a power offset of a Modulation and Coding Scheme (MCS) in different formats relative to a reference MCS; $f_{b,f,c}(i, l)$ is a transmitted power adjustment value of a terminal, which can be obtained by mapping transmitted power control information in a PDCCH.

For SRSs, a transmitted power of a terminal can be determined according to the following formula (2):

$$P_{SRS,b,f,c}(i, q_s, l) = \min\left\{ \begin{array}{l} P_{CMAX,f,c}(i), \\ P_{O\_SRS,b,f,c}(q_s) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i, l) \end{array} \right\}, \quad (2)$$

where, for meanings of b, f, c, i, and l, reference may be made to formula (1); $q_s$ is an RS resource index; $P_{SRS,b,f,c}(i, q_s, l)$ is an SRS transmitted power of a terminal; min is a minimum value; $P_{CMAX,b,f,c}(i)$ is a maximum transmitted power of a terminal, which is a configuration value; $P_{O\_SRS,b,f,c}(q_s)$ is a receiving power expected by an access network device, which can be configured by high-level signaling; μ is a subcarrier interval configuration; $M_{SRS,b,f,c}(i)$ is an SRS transmission bandwidth, which is expressed by a number of RBs; $\alpha_{b,f,c}(j)$ is a target path loss compensation factor; $PL_{b,f,c}(q_d)$ is a path loss value measured by a terminal; $h_{b,f,c}(i, l)$ is a transmitted power adjustment value of a terminal.

For PUCCHs, a transmitted power of a terminal can be determined according to the following formula (3):

$$P_{PUSCH,b,f,c}(i, q_u, q_d, l) = \min\left\{ \begin{array}{l} P_{CMAX,f,c}(i), \\ P_{O\_PUSCH,f,b,c}(q_u) + 10\log_{10}\left(2^\mu \cdot M_{RB,b,f,c}^{PUCCH}(i)\right) + PL_{b,f,c}(q_d) + \Delta_{F\_PUCCH}(F) + \Delta_{TF,b,f,c}(i) + g_{b,f,c}(i, l) \end{array} \right\}, \quad (3)$$

where, for meanings of b, f, c, i, and l, reference may be made to formula (1); $q_u$ and $q_d$ represent RS resource indexes; $P_{PUCCH,b,f,c}(i, q_u, q_d, l)$ an is a PUCCH transmitted power of a terminal; min is a minimum value; $P_{CMAX,f,c}(i)$ is a maximum transmitted power of a terminal, which is a configuration value; $P_{O\_PUCCH,b,f,c}(q_M)$ is a receiving power expected by an access network device, which can be configured by high-level signaling; μ is a subcarrier interval configuration; $M_{RB,b,f,c}^{PUCCH}(i)$ is a PUCCH transmission bandwidth, which is expressed by a number of RBs; $\alpha_{b,f,c}(j)$ is a target path loss compensation factor; $PL_{b,f,c}(q_d)$ is a path loss value measured by a terminal; $\Delta_{F\_PUCCH}(F)$ is determined according to a relative relationship between an applied PUCCH format and a PUCCH format 1a; $\Delta_{TF,b,f,c}(i)$ is a transmitted power offset configured by high-level signaling when two antenna ports are used to transmit PUCCHs; $g_{b,f,c}(i, l)$ is an adjustment value of a closed-loop power control of a terminal, which is obtained by mapping TPC information in PDCCHs.

That is, the transmitted power of the terminal is a minimum value from a maximum transmitted power and a calculated transmitted power value, and the calculated transmitted power value is equal to a sum of a receiving power expected by an access network device, a path loss compensation value, a closed-loop power offset, and other power offsets, where the path loss compensation value is a product of a target path loss compensation factor and a path loss value measured by the terminal.

The transmitted power configuration information from the access network device to the terminal includes the first path loss compensation factor and the second path loss compensation factor. The terminal can select to control the transmitted power of the terminal according to one of the first path loss compensation factor and the second path loss compensation factor as required, which is more flexible in application.

Due to a short time and a low data rate for the reduced capability terminal to transmit data, system interference is relatively small. Therefore, a larger path loss compensation factor is configured for the reduced capability terminal, which can compensate for coverage of the access network device after radio frequency requirements for the reduced capability terminal are decreased.

Figure 5:
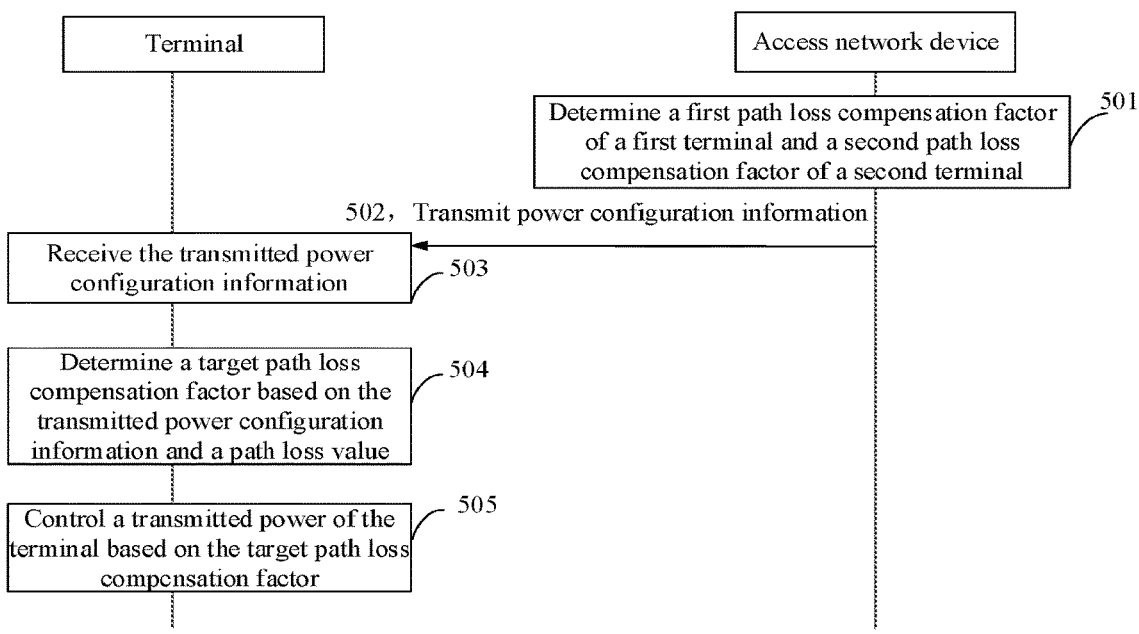
FIG. 5 is a flowchart illustrating an open-loop power control method according to an example.

FIG. 5 is a flowchart illustrating an open-loop power control method according to an example. The method may be executed jointly by an access network device and a terminal. Referring to FIG. 5, the method includes the following steps:

At step 501, an access network device determines a first path loss compensation factor of a first terminal and a second path loss compensation factor of a second terminal.

In some examples, the first terminal is a non-reduced capability terminal, and the second terminal is a reduced capability terminal.

In an example, the access network device determines there may be at least one first path loss compensation factor of the first terminal. For example, different first path loss compensation factors may be determined for different channels/signals. Second path loss compensation factors may be in one-to-one correspondence with first path loss compensation factors. The channels/signals include, but are not limited to, PUCCHs, PUSCHs and SRSs.

Values of at least a part of first path loss compensation factors are not equal to values of corresponding second path loss compensation factors. That is, values of all first path loss compensation factors may be not equal to values of corresponding second path loss compensation factors. For example, a value of a first path loss compensation factor is smaller than a value of a second path loss compensation factor. Or, values of some first path loss compensation factors are not equal to values of corresponding second path loss compensation factors. For example, values of first path loss compensation factors corresponding to PUCCHs are not equal to values of second path loss compensation factors, and values of first path loss compensation factors corresponding to PUSCHs and SRSs are equal to values of second path loss compensation factors.

In the examples of the present disclosure, path loss compensation factors may be referred to as power control factors or the like. Their value range can be [0, 1].

In an example, the first path loss compensation factor and the second path loss compensation factor are carried in a same message.

In some examples, the message may be a measurement control message. The message includes two parallel parameter groups, one of which is used to indicate the first path loss compensation factor, and the other one of which is used to indicate the second path loss compensation factor. In some examples, the message may further include an identifier corresponding to the second path loss compensation factor, so that the second terminal can identify the second path loss compensation factor. A parameter group is added to an existing message to indicate the second path loss compensation factor, which is easy to be implemented.

In some examples, the message may further include a path loss threshold. The path loss threshold is used for a terminal to determine a target path loss compensation factor from the first path loss compensation factor and the second path loss compensation factor.

In another example, the first path loss compensation factor and the second path loss compensation factor may be carried in different messages and transmitted respectively.

At step 503, a terminal receives the transmitted power configuration information.

At step 504, the terminal determines a target path loss compensation factor based on the transmitted power configuration information and a path loss value measured by the terminal.

The target path loss compensation factor is one of the first path loss compensation factor and the second path loss compensation factor, and the path loss value is a path loss value between the terminal and the access network device.

In some examples, step 504 includes, if the path loss value is not greater than a path loss threshold, using the first path loss compensation factor as the target path loss compensation factor; or, if the path loss value is greater than a path loss threshold, using the second path loss compensation factor as the target path loss compensation factor.

Determining, by the terminal, the target path loss compensation factor based on the transmitted power configuration information can be implemented through step 504.

The terminal can determine the path loss value between the access network device and the terminal according to various reference signals. Methods for determining the path loss value are not limited in the examples of the present disclosure, and any method in the related art can be adopted.

In some examples, when the terminal can determine the path loss value according to an SSB, and at least one reference signal other than the SSB (e.g., Channel-State Information Reference Signals (CSI-RSs)), the terminal can determine the target path loss compensation factor based on a magnitude relationship between the path loss value and the path loss threshold.

When the path loss value is not greater than the path loss threshold, a smaller first path loss compensation factor is used as a target control power coefficient, which can reduce power consumption of the terminal, and is beneficial to electricity saving of the terminal. When the path loss value is greater than the path loss threshold, a larger second path loss compensation factor is used as a target path loss compensation factor, which is beneficial to ensuring data transmission performance of the terminal.

It should be noted that, in some examples, the target path loss compensation factor can be determined directly based on the magnitude relationship between the path loss value and the path loss threshold without considering a type of a reference signal for determining the path loss value.

In an example, step 504 may be replaced by: determining, by the terminal, a target path loss compensation factor based on the transmitted power configuration information and a type of a reference signal, where the reference signal is used to determine a path loss value between the terminal and the access network device.

In some examples, determining, by the terminal, the target path loss compensation factor based on the transmitted power configuration information and the type of the reference signal may include, if the type of the reference signal includes only an SSB, using the first path loss compensation factor as the target path loss compensation factor; or, if the type of the reference signal includes an SSB, and at least one reference signal other than the SSB, using the second path loss compensation factor as the target path loss compensation factor.

If the terminal can estimate the path loss value based only on the reference signal, SSB, because a beam of the SSB is wider, the estimated path loss value is usually larger and the estimation is not accurate. Therefore, a transmitted power determined based on the path loss value is larger, which makes power consumption of the terminal higher, and is not beneficial to electricity saving of the terminal. In this case, a smaller first path loss compensation factor is used as the target path loss compensation factor, which is beneficial for the terminal to reduce power consumption, and thereby achieves the purpose of saving electricity. If the terminal can determine the path loss value according to the SSB and at least one reference signal other than the SSB, and the path loss value is relatively accurate, a larger second path loss compensation factor is used as the target path loss compensation factor, which is beneficial to ensuring data transmission performance of the terminal.

In another example, step 504 may be replaced by: determining, by the terminal, a target path loss compensation factor based on the transmitted power configuration information and a type/types of a channel/signal through which the terminal transmits data.

In some examples, determining, by the terminal, the target path loss compensation factor based on the transmitted power configuration information and the type/types of the channel/signal through which the terminal transmits data includes, if the type/types of the channel/signal is/are PUCCHs, using the first path loss compensation factor as the target path loss compensation factor; or, if the type/types of the channel/signal is/are non-PUCCHs, using the second path loss compensation factor as the target path loss compensation factor.

Due to higher requirements for transmission performance of data on the PUCCHs, the first path loss compensation factor for the PUCCHs usually takes a larger value, such as 1. In this case, the second terminal can directly use the first path loss compensation factor as the target path loss compensation factor, so as to ensure the transmission performance of data on the PUCCHs.

At step 505, the terminal controls a transmitted power of the terminal based on the target path loss compensation factor.

For contents related to step 505, reference may be made to step 405, and detailed description thereof is omitted here.

The transmitted power configuration information from the access network device to the terminal includes the first path loss compensation factor and the second path loss compensation factor. The terminal can select to control the transmitted power of the terminal according to one of the first path loss compensation factor and the second path loss compensation factor as required, which is more flexible in application.

In addition, the terminal determines a target power coefficient according to the path loss value, which is beneficial to electricity saving of the terminal.

Figure 6:
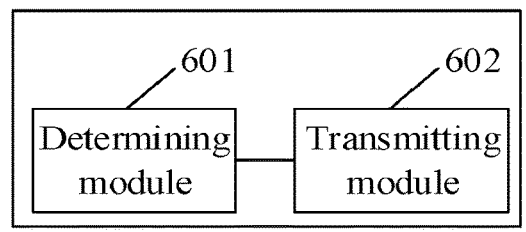
FIG. 6 is a schematic structural diagram illustrating an open-loop power control apparatus according to an example.

FIG. 6 is a schematic structural diagram illustrating an open-loop power control apparatus according to an example. The apparatus has functions of implementing an access network device in the method examples. The functions may be implemented by hardware, or by hardware executing corresponding software. As shown in FIG. 6, the apparatus includes: a determining module 601, and a transmitting module 602.

The determining module 601 is configured to determine a first path loss compensation factor of a first terminal and a second path loss compensation factor of a second terminal; the transmitting module 602 is configured to transmit power configuration information, where the power configuration information includes the first path loss compensation factor and the second path loss compensation factor.

In some examples, the first terminal is a non-reduced capability terminal, the second terminal is a reduced capability terminal, and a value of the first path loss compensation factor is smaller than a value of the second path loss compensation factor.

In some examples, the transmitting module 602 is further configured to transmit a path loss threshold.

The transmitted power configuration information from an access network device to a terminal includes the first path loss compensation factor and the second path loss compensation factor. The terminal can select to control a transmitted power of the terminal according to one of the first path loss compensation factor and the second path loss compensation factor as required, which is more flexible in application.

Figure 7:
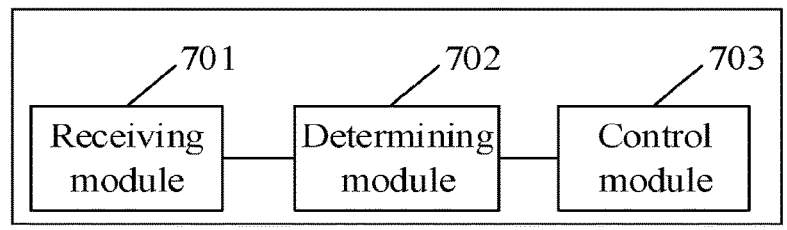
FIG. 7 is a schematic structural diagram illustrating an open-loop power control apparatus according to an example.

FIG. 7 is a schematic structural diagram illustrating an open-loop power control apparatus according to an example. The apparatus has functions of implementing a terminal in the method examples. The functions may be implemented by hardware, or by hardware executing corresponding software. As shown in FIG. 7, the apparatus includes: a receiving module 701, a determining module 702, and a control module 703.

The receiving module 701 is configured to receive transmitted power configuration information, where the transmitted power configuration information includes a first path loss compensation factor and a second path loss compensation factor; the determining module 702 is configured to determine a target path loss compensation factor based on the transmitted power configuration information, where the target path loss compensation factor is one of the first path loss compensation factor and the second path loss compensation factor; the control module 703 is configured to control a transmitted power of the terminal based on the target path loss compensation factor.

In an example, the determining module 702 is configured to: when the terminal is a non-reduced capability terminal, determine the first path loss compensation factor to be the target path loss compensation factor; or, when the terminal is a reduced capability terminal, determine the second path loss compensation factor to be the target path loss compensation factor, where a value of the first path loss compensation factor is smaller than a value of the second path loss compensation factor.

In an example, the determining module 702 is configured to: determine the target path loss compensation factor based on the transmitted power configuration information and a path loss value measured by the terminal.

In some examples, the determining module 702 is configured to: if the path loss value is not greater than a path loss threshold, use the first path loss compensation factor as the target path loss compensation factor; or, if the path loss value is greater than a path loss threshold, use the second path loss compensation factor as the target path loss compensation factor, where a value of the first path loss compensation factor is smaller than a value of the second path loss compensation factor.

In some examples, the receiving module 701 is further configured to: receive the path loss threshold from an access network device.

In an example, the determining module 702 is configured to: determine the target path loss compensation factor based on the transmitted power configuration information and a type of a reference signal, where the reference signal is used to determine a path loss value between the terminal and an access network device.

In some examples, the determining module 702 is configured to: if the type of the reference signal includes only an SSB, use the first path loss compensation factor as the target path loss compensation factor; or, if the type of the reference signal includes an SSB, and at least one reference signal other than the SSB, use the second path loss compensation factor as the target path loss compensation factor.

In an example, the determining module 702 is configured to determine the target path loss compensation factor based on the transmitted power configuration information and a type/types of a channel/signal through which the terminal transmits data.

In some examples, the determining module 702 is configured to, if the type/types of the channel/signal is/are PUCCHs, use the first path loss compensation factor as the target path loss compensation factor; or, if the type/types of the channel/signal is/are non-PUCCHs, use the second path loss compensation factor as the target path loss compensation factor.

The transmitted power configuration information from an access network device to a terminal includes the first path loss compensation factor and the second path loss compensation factor. The terminal can select to control a transmitted power of the terminal according to one of the first path loss compensation factor and the second path loss compensation factor as required, which is more flexible in application.

Figure 8:
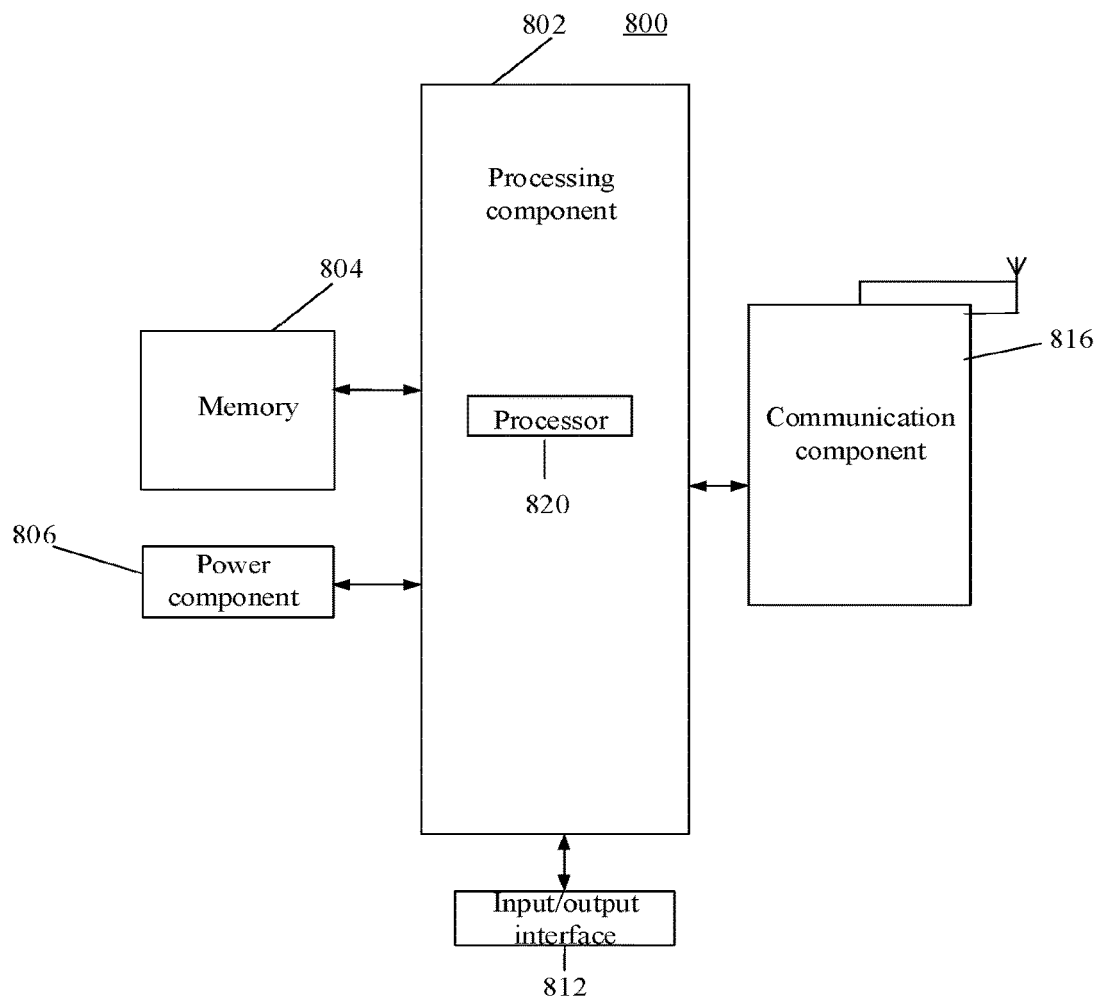
FIG. 8 is a block diagram illustrating an open-loop power control apparatus according to an example.

FIG. 8 is a block diagram illustrating an open-loop power control apparatus 800 according to an example. The apparatus 800 can be an access network device. Referring to FIG. 8, the open-loop power control apparatus 800 may include one or more of the following components: a processing component 802, a memory 804, a power component 806, an input/output (I/O) interface 812, and a communication component 816.

The processing component 802 usually controls the overall operation of the open-loop power control apparatus 800, such as operations associated with display, telephone calls, data communications, camera operations, and recording operations. The processing component 802 may include one or more processors 820 to execute instructions to perform all or part of the steps in the methods described above. Moreover, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operation at the open-loop power control apparatus 800. The memory 804 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 806 provides power to various components of the open-loop power control apparatus 800. The power component 806 may include a power management system, one or more power sources, and other components associated with power generated, managed, and distributed for the open-loop power control apparatus 800.

The I/O interface 812 provides an interface between the processing component 802 and a peripheral interface module which may be a keyboard, a click wheel, a button, or the like. These buttons may include, but are not limited to a home button, a volume button, a start button, and a lock button.

The communication component 816 is configured to facilitate wireless communication between an access network device and other devices. In the examples of the present disclosure, the communication component 816 can provide a wireless network based on a communication standard, such as 2G, 3G 4G or 5G, or a combination thereof.

In an example, the open-loop power control apparatus 800 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above open-loop power control methods.

In an example, there is also provided a non-transitory computer readable storage medium including instructions, such as a memory 804 including instructions, where the instructions are executable by the processor 820 of the open-loop power control apparatus 800 to perform the open-loop power control methods as described above. For example, the non-transitory computer readable storage medium may be a ROM, a random access memory (RAM), a CD-ROM, a magnetic tape, a floppy disk, and an optical data storage device.

Figure 9:
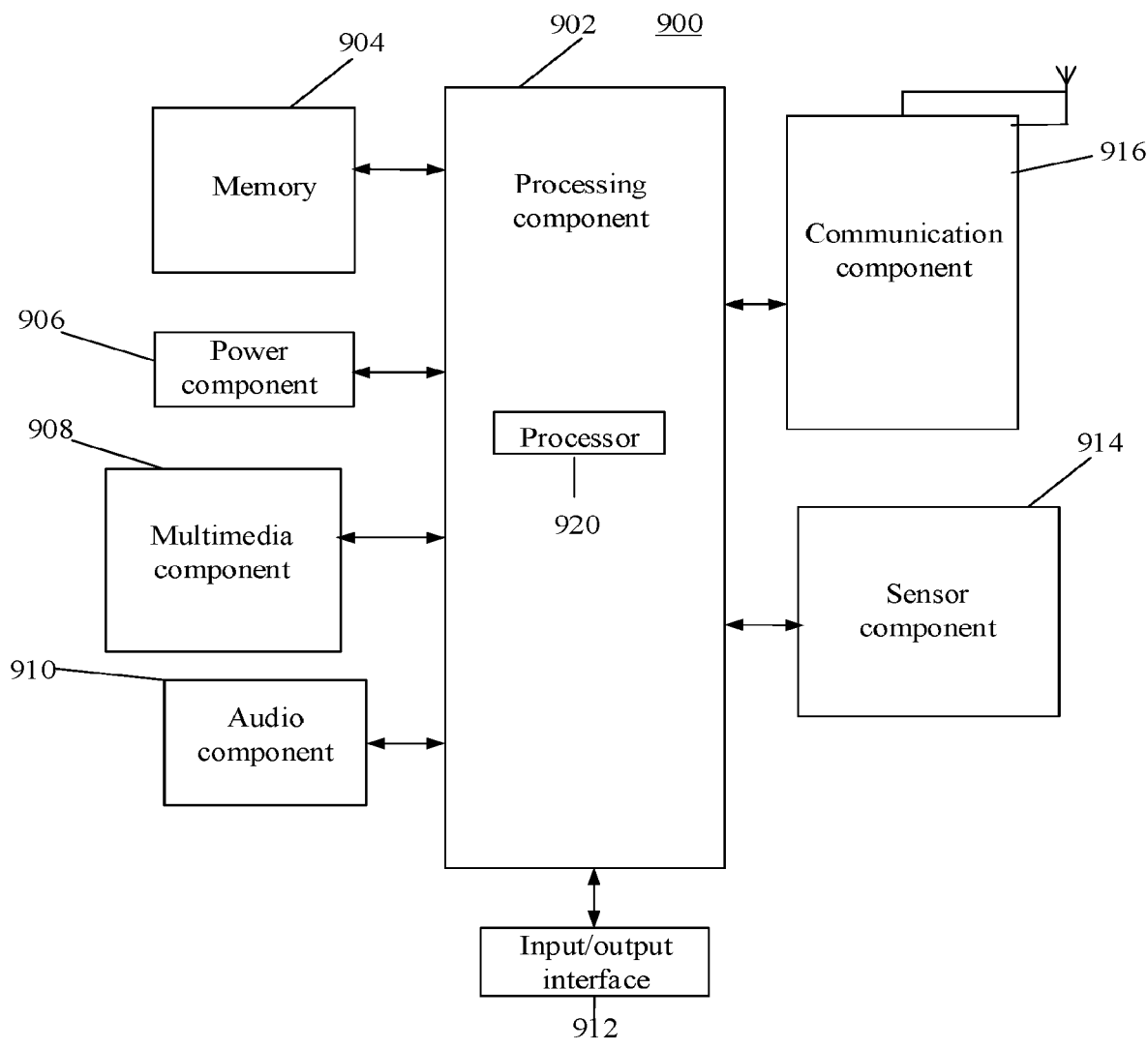
FIG. 9 is a block diagram illustrating an open-loop power control apparatus according to an example.

FIG. 9 is a block diagram illustrating an open-loop power control apparatus 900 according to an example. The apparatus 900 can be a terminal. Referring to FIG. 9, the open-loop power control apparatus 900 may include one or more of the following components: a processing component 902, a memory 904, a power component 906, a multimedia component 908, an audio component 910, an input/output (I/O) interface 912, a sensor component 914, and a communication component 916.

The processing component 902 usually controls the overall operation of the open-loop power control apparatus 900, such as operations associated with display, telephone calls, data communications, camera operations, and recording operations. The processing component 902 may include one or more processors 920 to execute instructions to perform all or part of the steps in the methods described above. Moreover, the processing component 902 may include one or more modules to facilitate interaction between the processing component 902 and other components. For example, the processing component 902 may include a multimedia module to facilitate interaction between the multimedia component 908 and the processing component 902.

The memory 904 is configured to store various types of data to support operation at the open-loop power control apparatus 900. Examples of these data include instructions for any application or method operating at the open-loop power control apparatus 900, contact data, phone book data, messages, pictures, videos, and the like. The memory 904 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 906 provides power to various components of the open-loop power control apparatus 900. The power component 906 may include a power management system, one or more power sources, and other components associated with power generated, managed, and distributed for the open-loop power control apparatus 900.

The multimedia component 908 includes a screen that provides an output interface between the open-loop power control apparatus 900 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 908 includes a front camera and/or a rear camera. When the open-loop power control apparatus 900 is in an operation mode, such as a shooting mode or a video mode, the front camera and/or the rear camera may receive external multimedia data. Each of the front and rear cameras may be a fixed optical lens system or have a focal length and an optical zoom capability.

The audio component 910 is configured to output and/or input audio signals. For example, the audio component 910 includes a microphone (MIC) configured to receive an external audio signal when the open-loop power control apparatus 900 is in an operation mode, such as a call mode, a recording mode, and a voice recognition mode. The received audio signal may be further stored in the memory 904 or transmitted via the communication component 916. In some examples, the audio component 910 also includes a loudspeaker for outputting an audio signal.

The I/O interface 912 provides an interface between the processing component 902 and a peripheral interface module which may be a keyboard, a click wheel, a button, or the like. These buttons may include, but are not limited to a home button, a volume button, a start button, and a lock button.

The sensor component 914 includes one or more sensors for providing a status assessment in various aspects to the open-loop power control apparatus 900. For example, the sensor component 914 may detect an open/closed state of the open-loop power control apparatus 900, and the relative positioning of components, for example, the component is a display and a keypad of the open-loop power control apparatus 900. The sensor component 914 may also detect a change in position of the open-loop power control apparatus 900 or a component of the open-loop power control apparatus 900, the presence or absence of a user in contact with the open-loop power control apparatus 900, the orientation or acceleration/deceleration of the open-loop power control apparatus 900 and a change in temperature of the open-loop power control apparatus 900. The sensor component 914 may include a proximity sensor configured to detect the presence of nearby objects without any physical contact. The sensor component 914 may also include a light sensor, such as a CMOS or CCD image sensor, for use in imaging applications. In some examples, the sensor component 914 may also include an acceleration sensor, a gyro sensor, a magnetic sensor, a pressure sensor, or a temperature sensor.

The communication component 916 is configured to facilitate wireless communication between the open-loop power control apparatus 900 and other devices. In the examples of the present disclosure, the communication component 916 can access a wireless network based on a communication standard, such as 2G, 3G, 4G or 5G, or a combination thereof, so as to realize random access. In an example, the communication component 916 receives broadcast signals or broadcast associated information from an external broadcast management system via a broadcast channel. In some examples, the communication component 916 also includes a near field communication (NFC) module.

In an example, the open-loop power control apparatus 900 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above open-loop power control methods.

In an example, there is also provided a non-transitory computer readable storage medium including instructions, such as a memory 904 including instructions, where the instructions are executable by the processor 920 of the open-loop power control apparatus 900 to perform the open-loop power control methods as described above. For example, the non-transitory computer readable storage medium may be a ROM, a random access memory (RAM), a CD-ROM, a magnetic tape, a floppy disk, and an optical data storage device.

In an example of the present disclosure, there is also provided a communication system, including an access network device and a terminal. The access network device includes the open-loop power control apparatus provided in the example shown in FIG. 8. The terminal includes the open-loop power control apparatus provided in the example shown in FIG. 9.

Other embodiments of the present disclosure will be readily apparent to those skilled in the art after considering the specification and practicing the contents disclosed herein. The present disclosure is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

The invention claimed is:

1. An open-loop power control method, comprising:
receiving, by a terminal, transmitted power configuration information, wherein the transmitted power configuration information comprises a first path loss compensation factor and a second path loss compensation factor;
determining, by the terminal, a target path loss compensation factor based on the transmitted power configuration information, wherein the target path loss compensation factor is one of the first path loss compensation factor and the second path loss compensation factor; and
controlling, by the terminal, a transmitted power of the terminal based on the target path loss compensation factor;
wherein determining, by the terminal, the target path loss compensation factor based on the transmitted power configuration information comprises:
determining, by the terminal, the target path loss compensation factor based on the transmitted power configuration information and a path loss value measured by the terminal;
or
determining, by the terminal, the target path loss compensation factor based on the transmitted power configuration information and a type of a reference signal, wherein the reference signal is used to determine a path loss value between the terminal and an access network device;
or
determining, by the terminal, the target path loss compensation factor based on the transmitted power configuration information and a type/types of a channel/signal through which the terminal transmits data.

2. The method according to claim 1, wherein determining, by the terminal, the target path loss compensation factor based on the transmitted power configuration information and the path loss value measured by the terminal comprises:
determining the first path loss compensation factor as the target path loss compensation factor, wherein the path loss value is not greater than a path loss threshold; or,
determining the second path loss compensation factor as the target path loss compensation factor, wherein the path loss value is greater than a path loss threshold;
wherein a value of the first path loss compensation factor is smaller than a value of the second path loss compensation factor.

3. The method according to claim 2, further comprising:
receiving, by the terminal, the path loss threshold from an access network device.

4. The method according to claim 1, wherein determining, by the terminal, the target path loss compensation factor based on the transmitted power configuration information and the type of the reference signal comprises:
determining the first path loss compensation factor as the target path loss compensation factor, wherein the type of the reference signal comprises only an SSB; or,
determining the second path loss compensation factor as the target path loss compensation factor, wherein the type of the reference signal comprises an SSB, and at least one reference signal other than the SSB;
wherein a value of the first path loss compensation factor is smaller than a value of the second path loss compensation factor.

5. The method according to claim 1, wherein determining, by the terminal, the target path loss compensation factor based on the transmitted power configuration information and the type/types of the channel/signal through which the terminal transmits data comprises:

determining the first path loss compensation factor as the target path loss compensation factor, wherein the type/types of the channel/signal is/are PUCCHs; or, determining the second path loss compensation factor as the target path loss compensation factor, wherein the type/types of the channel/signal is/are non-PUCCHs;

wherein a value of the first path loss compensation factor is smaller than a value of the second path loss compensation factor.

6. A non-transitory computer readable storage medium, wherein instructions in the computer readable storage medium are executed by a processor to implement an open-loop power control method according to claim 1.

7. A terminal, comprising:
a processor;
a memory for storing processor executable instructions;
wherein the processor is configured to:
receive transmitted power configuration information, wherein the transmitted power configuration information comprises a first path loss compensation factor and a second path loss compensation factor;
determine a target path loss compensation factor based on the transmitted power configuration information, wherein the target path loss compensation factor is one of the first path loss compensation factor and the second path loss compensation factor; and
control a transmitted power of the terminal based on the target path loss compensation factor;
wherein when determining the target path loss compensation factor based on the transmitted power configuration information, the processor is further configured to:

determine the target path loss compensation factor based on the transmitted power configuration information and a path loss value measured by the terminal;
or
determine, by the terminal, the target path loss compensation factor based on the transmitted power configuration information and a type of a reference signal, wherein the reference signal is used to determine a path loss value between the terminal and an access network device;
or
determine, by the terminal, the target path loss compensation factor based on the transmitted power configuration information and a type/types of a channel/signal through which the terminal transmits data.

8. The terminal according to claim 7, wherein when determining the target path loss compensation factor based on the transmitted power configuration information and the path loss value measured by the terminal, the processor is further configured to:
determine the first path loss compensation factor as the target path loss compensation factor, wherein the path loss value is not greater than a path loss threshold; or,
determine the second path loss compensation factor as the target path loss compensation factor, wherein the path loss value is greater than a path loss threshold;
wherein a value of the first path loss compensation factor is smaller than a value of the second path loss compensation factor.

9. The terminal according to claim 8, wherein the processor is further configured to:
receive the path loss threshold from an access network device.

* * * * *